W. F. BOUCHÉ.
ELECTRICAL REGULATION SYSTEM.
APPLICATION FILED JUNE 18, 1915.
1,290,013.
Patented Dec. 31, 1918.
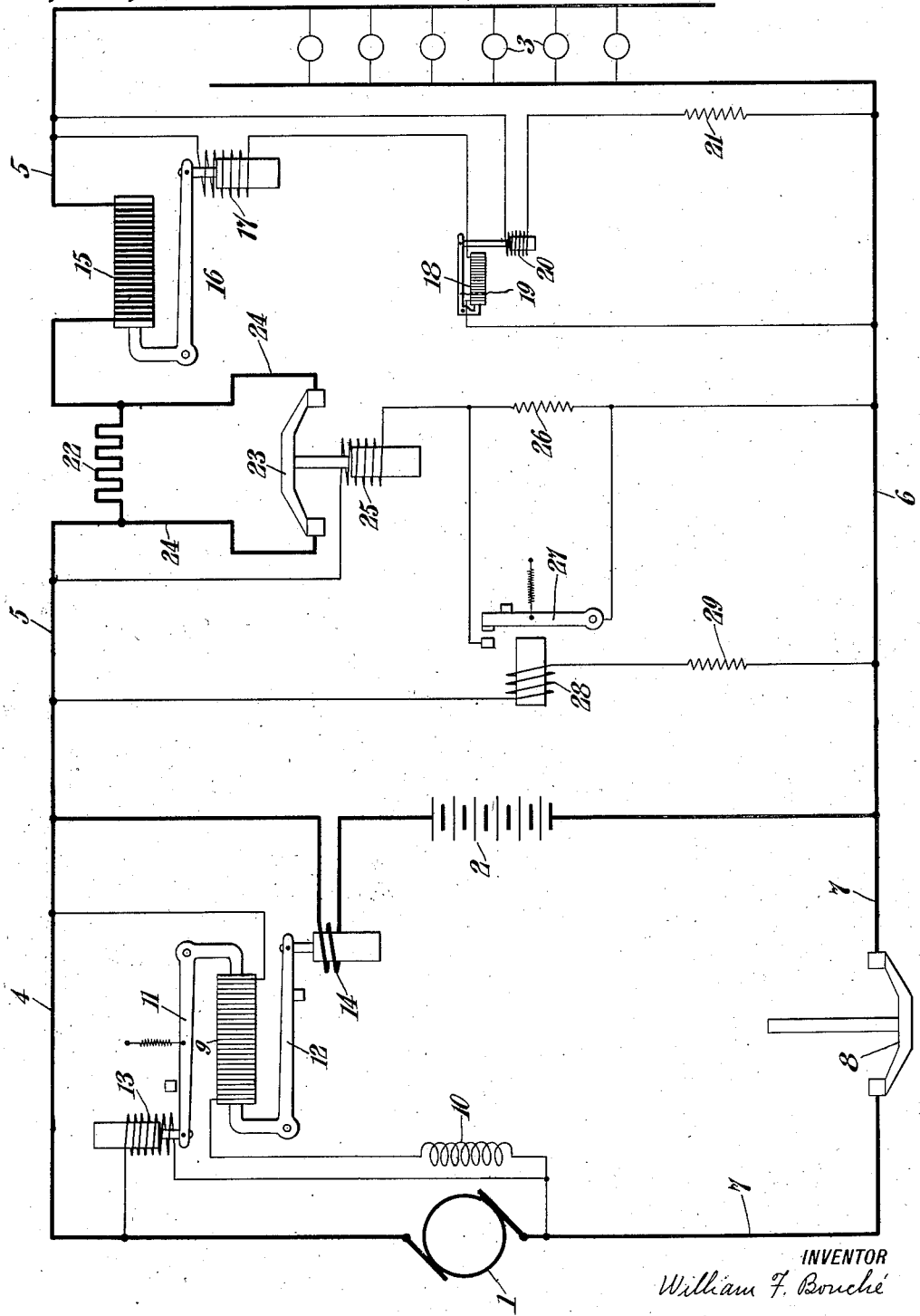
INVENTOR
William F. Bouché
BY
Kenyon & Kenyon
ATTORNEYS

UNITED STATES PATENT OFFICE.

WILLIAM F. BOUCHÉ, OF BUFFALO, NEW YORK, ASSIGNOR TO GOULD COUPLER COMPANY, A CORPORATION OF NEW YORK.

ELECTRICAL REGULATION SYSTEM.

1,290,013.      Specification of Letters Patent.      Patented Dec. 31, 1918.

Application filed June 18, 1915. Serial No. 34,866.

*To all whom it may concern:*

Be it known that I, WILLIAM F. BOUCHÉ, a citizen of the United States, and a resident of Buffalo, county of Erie, State of New York, have invented certain new and useful Improvements in Electrical Regulation Systems, of which the following is a specification.

The invention relates to electrical systems and more particularly to the regulation of circuits therein. In certain systems, such as car lighting systems, where it is desired to regulate the voltage applied to lamps or translating devices by a source of variable voltage it has been common to insert in series with the translating devices an automatic compressible variable resistance, such as a carbon pile controlled responsive to voltage changes. In the operation of such regulators with variable loads on the translating devices, it is sometimes found that the load exceeds the capacity of the carbon pile. This is especially true if a single regulator be connected to regulate the voltage on the lamps for a plurality of cars. A regulator of sufficient size to efficiently carry such large loads would be too large and unwieldy for satisfactory use. Accordingly, one object of my invention is to provide an arrangement whereby, when there is a large load to be carried by the carbon pile regulator with a consequent large consumption of energy and dissipation of heat therein, additional resistance will be automatically inserted in series with the carbon pile regulator, so that this added resistance will take a portion of the drop between the source and the translating devices, thereby limiting the energy consumed or dissipated by the carbon pile, permitting part to be dissipated by the inserted resistance. Further objects, features and advantages will more clearly appear from the detailed description given below, taken in connection with the accompanying drawing, which forms a part of this specification.

The drawing is a diagram illustrating the invention as applied to a simple car lighting system.

Referring to the drawing, 1 represents a generator driven at a variable speed as from a car axle and adapted to supply a battery 2 and lamps or translating devices 3, through the mains 4, 5, 6 and 7. An automatic switch 8 is placed in the main 7 for disconnecting the generator when its speed is too low to supply the battery or translating devices, whereupon the translating devices are fed from the battery. For regulating the generator voltage when the generator is connected to the battery, a carbon pile 9 is placed in series with the generator shunt field 10. The resistance of pile 9 is varied by means of two levers 11 and 12, one operating on one end of the pile and the other operating on the other end of the pile, the former being controlled by a voltage solenoid 13 and the latter by a current solenoid 14. During the charging of the battery the current is limited by means of the solenoid 14 acting on the pile 9 to regulate the voltage of the generator in a well known manner. When the battery has become substantially charged, the consequent increase in voltage across the mains 4 and 7 causes the voltage solenoid 13 to assume control of the pile 9 and limit the voltage of the generator, causing the charging current to taper off, as desired.

In order that the variable voltage across the generator may not fall upon the lamps 3 a compressible variable resistance regulator or carbon pile 15 is placed in series with the lamps between the battery and lamps. The pile 15 is controlled by a lever 16 operated by a solenoid 17 connected across the lamp mains 5 and 6, so as to be responsive to voltage changes across the lamps. In series with the solenoid 17 is another carbon pile variable resistance 18 controlled by a lever 19 operated by a solenoid 20 also connected across the lamps 3 through fixed resistance 21. A decrease in voltage across the lamps decreases the strength of solenoid 20, increases the resistance of pile 18, thereby weakening solenoid 17 and decreasing the resistance of pile 15, and any increase in voltage across the lamps increases the strength of solenoid 20, which decreases the resistance of pile 18, thereby increasing the strength of solenoid 17, which changes the resistance of pile 15 so that the voltage at the lamps is maintained substantially constant.

22 represents a fixed grid resistance connected in series with the pile 15 between the battery and the lamps. The resistance 22 is normally shunted by an automatic switch 23 and connections 24. The switch 23 is operated by a voltage solenoid 25 connected across the battery through a resistance 26. 27 represents a relay switch, which, when attracted by the magnet 28 (the windings of which are also connected across the battery through a resistance 29) short circuits the resistance 26, thereby greatly increasing the strength of solenoid 25, causing it to open the shunt short circuit about the grid resistance 22 and insert the resistance 22 in circuit in series with the resistance 15.

It is desired to limit the drop across the pile, and consequently the load carried thereby, when the drop across the pile has reached the desired maximum or the practical carrying capacity of the pile.

Therefore, when the generator voltage rises to that point where the voltage drop across the pile 15 is of the desired maximum, the voltage magnet 28 attracts switch 27 causing resistance 26 to be short circuited, thereby increasing the strength of solenoid 25 sufficiently to operate switch 23 and insert resistance 22 in series with the pile 15 by removal of shunt circuit about resistance 22. The insertion of resistance 22 results in a large portion of the drop taking place therein, permitting the carbon pile 15 to be more compressed and take less of the drop between the battery and lamps, so that its carrying capacity is not exceeded. When the voltage across the generator and battery drops to a certain point, the switch 27 will open, decreasing the strength of solenoid 25, so that switch 23 will close the short circuit about resistance 22 and substantially remove it from the circuit being regulated.

I do not desire to be limited to the details shown and described, since many variations, substitutions and changes may well be made and the invention, in its broader aspects, applied to other situations without departing from the spirit and scope of my invention in its broader aspects, as set forth in the appended claims.

Having fully and clearly described my invention, what I claim as new and desire to secure by Letters Patent, is:

1. In a system of electrical distribution of the type in which a work circuit is supplied from a source of varying voltage, but is maintained at substantially constant voltage by automatic control of a variable resistance between the source and work circuit, the combination with said variable resistance of a second resistance and a voltage responsive means adapted to insert it in series with the variable resistance to limit the voltage drop across the same.

2. The combination as recited in claim 1 when the variable resistance is composed of a number of contacting units.

3. The combination with a work circuit, a variable resistance in series therewith and means for controlling the same in response to variations of work circuit voltage, of means controlled by the voltage of the system at the source side of said variable resistance for inserting resistance in series with said variable resistance.

4. In a car lighting system, the combination with a variable speed generator, a storage battery, a lamp circuit and a variable resistance in series with said lamp circuit controlled to maintain substantially constant potential at the lamps, of a resistance adapted to be inserted in series with the said variable resistance and means acting to insert the same upon a given rise in voltage of a part of the system.

5. In a car lighting system, the combination with a variable speed generator, a storage battery, a lamp circuit and a variable resistance comprising a number of contacting units in series with said lamp circuit controlled to maintain substantially constant potential at the lamps, of a resistance adapted to be inserted in series with the said variable resistance and means acting to insert the same upon a given rise in voltage of a part of the system.

In testimony whereof, I have signed name to this specification.

WILLIAM F. BOUCHÉ.